United States Patent
Brown et al.

(10) Patent No.: US 10,216,934 B2
(45) Date of Patent: Feb. 26, 2019

(54) INFERENTIAL EXPLOIT ATTEMPT DETECTION

(71) Applicant: CrowdStrike, Inc., Irvine, CA (US)

(72) Inventors: Daniel W. Brown, Beverly, MA (US); Ion-Alexandru Ionescu, Seattle, WA (US); Loren C. Robinson, West Deptford, NJ (US)

(73) Assignee: CrowdStrike, Inc., Irvine, CA (US)

( * ) Notice: Subject to any disclaimer, the term of this patent is extended or adjusted under 35 U.S.C. 154(b) by 140 days.

(21) Appl. No.: 15/213,004

(22) Filed: Jul. 18, 2016

(65) Prior Publication Data

US 2018/0018460 A1  Jan. 18, 2018

(51) Int. Cl.
| G06F 21/50 | (2013.01) |
| H04L 29/06 | (2006.01) |
| G06F 21/56 | (2013.01) |
| G06F 21/55 | (2013.01) |
| G06F 21/57 | (2013.01) |

(52) U.S. Cl.
CPC .......... G06F 21/566 (2013.01); G06F 21/554 (2013.01); G06F 21/577 (2013.01); G06F 2221/034 (2013.01)

(58) Field of Classification Search
CPC .......... G06F 21/55; G06F 21/56; G06F 21/50; H04L 63/14
See application file for complete search history.

(56) References Cited

U.S. PATENT DOCUMENTS

| 8,401,982 B1 | 3/2013 | Satish et al. |
| 2004/0168078 A1 | 8/2004 | Brodley et al. |
| 2007/0169194 A1* | 7/2007 | Church ............... G06F 21/552 726/23 |
| 2013/0312098 A1 | 11/2013 | Kapoor et al. |
| 2014/0298469 A1 | 10/2014 | Marion et al. |
| 2015/0215335 A1 | 7/2015 | Giuliani et al. |

OTHER PUBLICATIONS

Church et al, Anomaly Detection using Call Stack Information, 2003, IEEE Symposium on Security and Privacy, pp. 3-6.*
PCT Invitation to Pay Additional Fees dated Sep. 6, 2017 for PCT Application No. PCT/US17/42451, 2 pages.
PCT Search Report and Written Opinion dated Nov. 17, 2017 for PCT Application No. PCT/US17/42451, 12 pages.

* cited by examiner

*Primary Examiner* — Izunna Okeke
(74) *Attorney, Agent, or Firm* — Lee & Hayes, P.C.

(57) ABSTRACT

A security agent implemented on a monitored computing device is described herein. The security agent is configured to detect an action of interest (AoI) that may be probative of a security exploit and to determine a context in which that AoI occurred. Based on that context, the security agent is further configured to decide whether the AoI is a security exploit and can take preventative action to prevent the exploit from being completed.

18 Claims, 4 Drawing Sheets

INFERENTIAL EXPLOIT ATTEMPT DETECTION

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

To counter these threats, governments, enterprises, and individuals use a range of security applications and services. Typically, these applications and services scan a device for a signature of a security exploit. Responsive to finding the signature, the applications and services quarantine or delete the exploit. The applications and services often miss more sophisticated security exploits, however, and often the applications and services are not configured to detect exploits or take any actions until an exploit has gained a substantial foothold on a device.

For example, actions taken by malicious code to gain a foothold on a device (e.g., through exploiting a vulnerability in the device) are often also actions commonly taken by benign code, so current measures either do not attempt to take preventative measures at this initial stage of an exploit or are limited to alerting a user, due to the high likelihood of confusion of a benign action with a malicious one. This failure to take action can result in further damage, loss, or difficulty in removing the exploit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, inferential exploit detection. In some examples, the techniques discussed herein can be implemented on and/or for a computing device and can include determining a computing context for an action of interest (AoI) committed by an object (i.e., a function, module, process, or thread) executed by the computing device, where the AoI is an action that has a tendency to be associated with security exploits of computing devices and may therefore be suspicious. In some examples, objects can include and/or be associated with other objects such as, for example, executable modules loaded in memory as a part of a parent module, run by another module, and/or otherwise associated with another module (i.e., "loaded modules," "modules). In some examples, the computing context can include actions and/or states of the computing device that led the computing device to commit the AoI. For example, the computing context can include a process or thread that committed the AoI, what parameters or variables the AoI used, what chain of function calls resulted in the AoI and data related to one or more of those functions, register data, heap data, stack data, a suspicious event record (e.g., a record of the state and/or actions of the monitored device that is saved when an AoI occurs), etc.

The techniques discussed herein can detect that an AoI is an exploit based at least in part on analyzing a computing context and inferring from the computing context that the AoI is an exploit. In some examples, the techniques can take preventative action (e.g., blocking the AoI or an object associated with the AoI) without input from a user. Former solutions for blocking an exploit were associated with false positive rates that were too high to take preventative measures and therefore required user notification and/or user input in order to take preventative measures. The techniques discussed herein decrease false positive rates of identifying benign actions as malicious ones, or, equivalently, increase a confidence that an action is malicious. In some examples, the techniques discussed herein increase that confidence to an adequate level that preventative actions can be taken without requesting or receiving user input, thereby greatly increasing the ease for a user to implement robust security for a computing device and preventing greater damage from occurring due to an exploit by stopping a preliminary action of the exploit.

The techniques discussed herein can include configuring a security agent with a call stack actor (CSA) or configuring the security agent to operate with an independently configured CSA for inferential exploit attempt detection, where detection of an attempted exploit is inferred from a computing context that includes call stack analysis. Moreover, the techniques discussed herein can additionally or alternatively include a security agent configured to create and maintain a suspicious event record for inferential exploit attempt detection.

Example Operation

Figure 1:
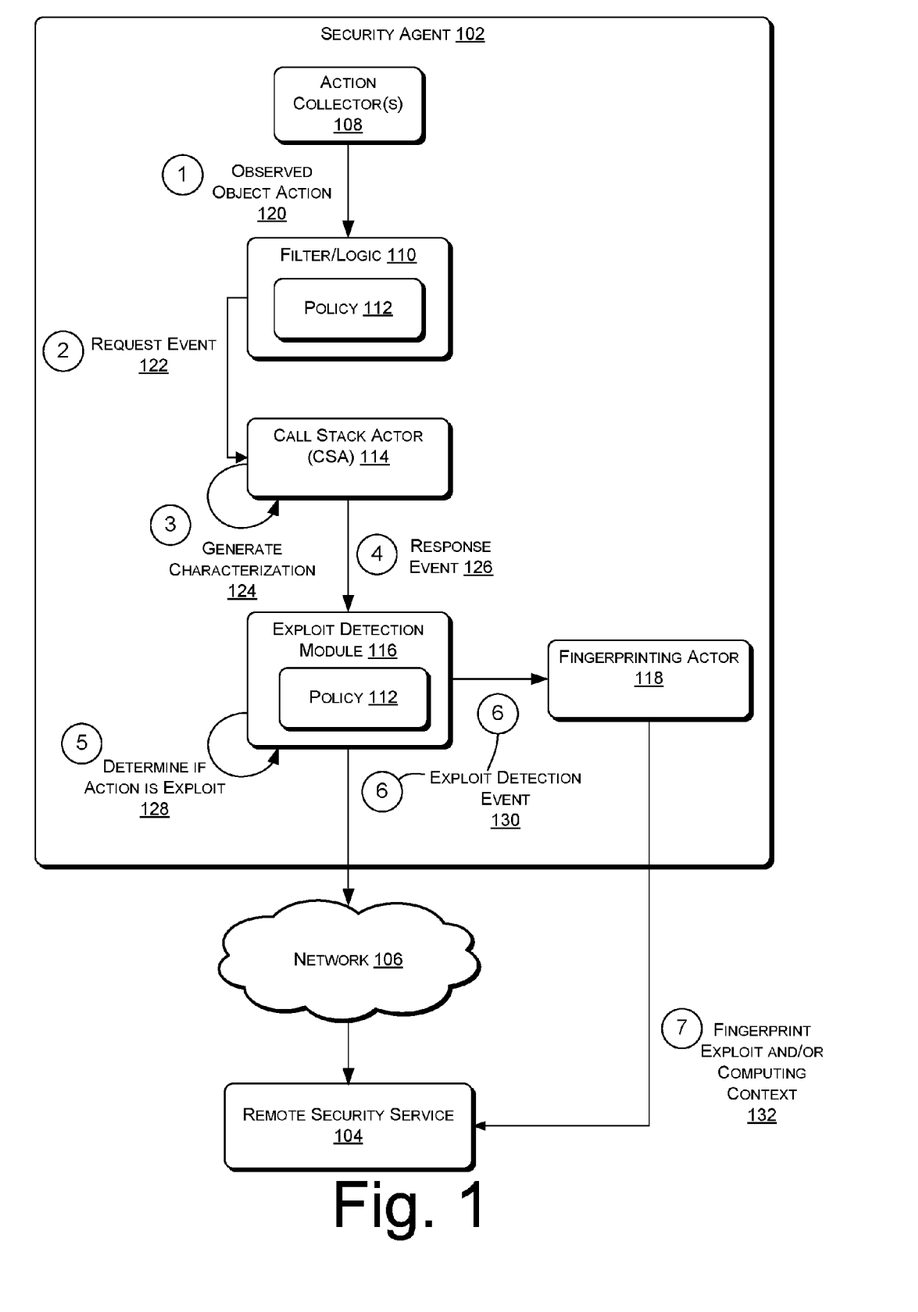
FIG. 1 illustrates an example overview of a security agent implemented on a monitored computing device and actions taken by the security agent to inferentially detect exploits from a computing context.

FIG. 1 illustrates an example overview of a security agent implemented on a monitored computing device and actions taken by that security agent to inferentially detect exploits from a computing context. As illustrated in FIG. 1, a security agent 102 can be configured by, and communicate with, a remote security service 104 over a network 106. An example security agent 102 is described in greater detail in U.S. Pat.

No. 9,043,903, entitled "Kernel-Level Security Agent" and filed on Jun. 8, 2012. The security agent 102 can include action collector(s) 108, a filter/logic 110 and policy 112, a call stack actor (CSA) 114, an exploit detection module 116 (which in some examples can be a configuration of the security agent 102 and/or the CSA), and fingerprinting actor 118.

In various implementations, the computing device implementing the security agent 102 (referred to herein interchangeably as the "computing device and the "monitored computing device") and the device(s) of the remote security service 104 may be connected by network 106. Network 106 may include any one or more networks, such as wired networks, wireless networks, and combinations of wired and wireless networks. Further, network 106 may include any one or combination of multiple different types of public or private networks (e.g., cable networks, the Internet, wireless networks, etc.). In some instances, computing devices communicate over the network 106 using a secure protocol (e.g., https) and/or any other protocol or set of protocols, such as the transmission control protocol/Internet protocol (TCP/IP).

Figure 3:
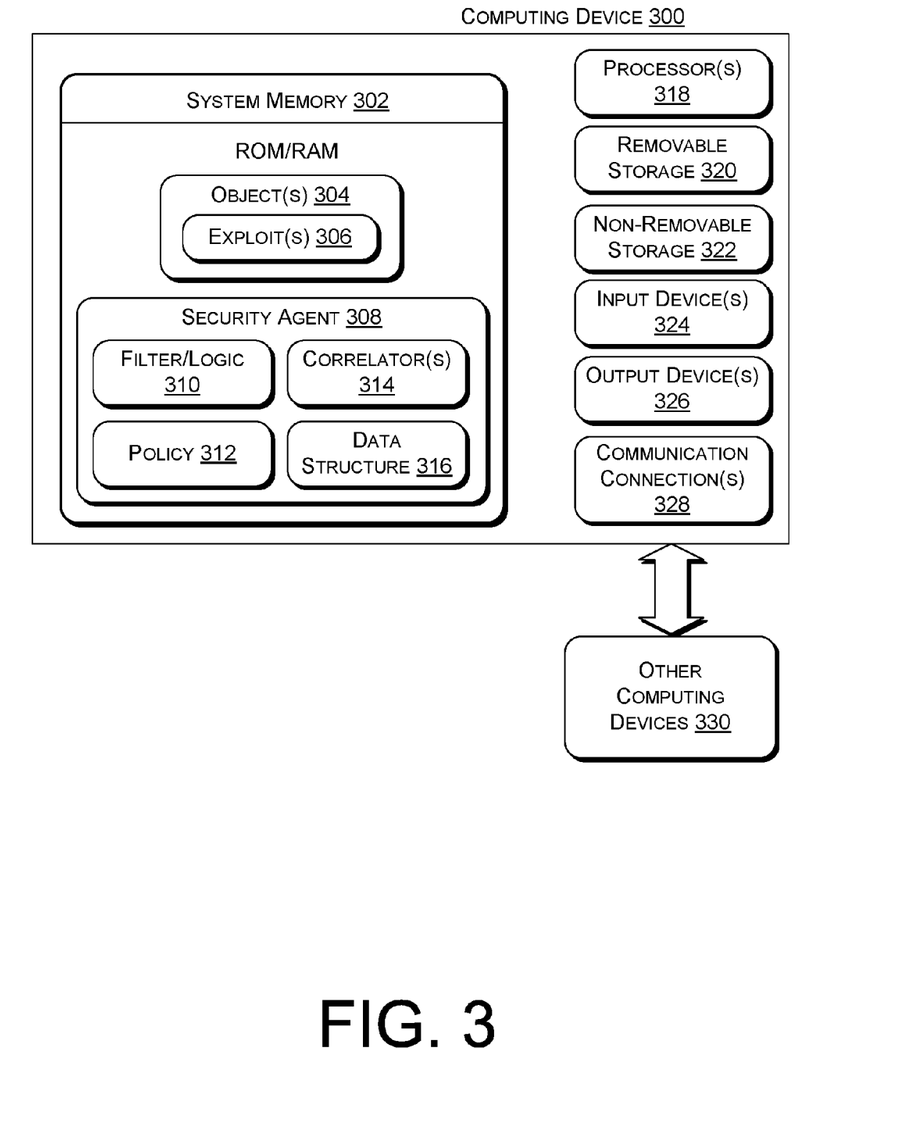
FIG. 3 illustrates a component level view of a monitored computing device configured with objects targeted by exploits and a security agent.

The computing device implementing the security agent 102 and the device(s) of the remote security service 104 may each be or include a server or server farm, multiple, distributed server farms, a mainframe, a work station, a personal computer (PC), a laptop computer, a tablet computer, a personal digital assistant (PDA), a smartphone, a wearable computing device, a smart vehicle, a cellular phone, a media center, an embedded system, or any other sort of device or devices. In one implementation, the device(s) of the remote security service 104 represent a plurality of computing devices working in communication, such as a cloud computing network of nodes. In some implementations, one or more of the computing device implementing the security agent 102 and the device(s) of the remote security service 104 represent one or more virtual machines implemented on one or more computing devices. An example computing device capable of serving as the computing device implementing the security agent 102 is illustrated in FIG. 3 and is described below with reference to that figure.

In various implementations, remote security service 104 may provide security service(s) to the computing device implementing the security agent 102 and to any number of other computing devices implementing other instances of the security agent 102. The remote security service 104 may receive notifications of interesting events from security agent 102, including exploit detection event notifications, as well as forensic data associated with those interesting events and/or fingerprints from the fingerprinting actor 118. The remote security service 104 may determine if related notifications have been received from other instances of security agent 102 and/or evaluate the interesting event(s) based on one or more rules or heuristics.

The remote security service 104 may further perform any or all of generating an event and providing the event to the security agent 102 (e.g., for diagnostic, preventative, or healing purposes), generating a configuration update, generating an updated policy 112, healing the computing device implementing the security agent 102, deceiving an adversary associated with malicious code, or notifying entities or persons associated with the computing device implementing the security agent 102 of the potential malicious code. Upon generating a configuration update or an updated policy 112, the remote security service 104 may provide the configuration update or the updated policy 112 to the security agent 102.

The remote security service 104 can record fingerprints developed by the fingerprinting actor 118, as discussed below, and/or generate an updated policy 112 or a configuration update for the security agent 102 or CSA 114 based at least in part on the fingerprints.

In some implementations, the security agent 102 may be any sort of security agent, such as a security agent implemented at the kernel-level. The security agent 102 may be installed by and configurable by the remote security service 104, receiving, and applying while live, reconfigurations of components of the security agent 102. Such reconfigurations may cause updates to any component(s) of the security agent 102, such as the action collector(s) 108, the filter/logic 110 and policy 112, the CSA 114, the exploit detection module 116, or the fingerprinting actor 118, in some examples. The security agent 102 may perform at least one of monitoring events on the computing device implementing that security agent 102, maintaining state about some or all of the events on that computing device, notifying the remote security service 104 of one or more events on the computing device, or taking action responsive to a security exploit associated with one or more events on the computing device.

In some examples, the action collector(s) 108 observe all sorts of actions, including actions associated with objects. To receive the events, the action collector(s) 108 may register with hooks or filters to receive notifications of the occurrence or non-occurrence of certain events associated with objects or activities of interest. Action collector(s) 108 may also monitor locations in memory or log files, or spawn a thread to do so, observing events associated with the log files or memory locations. Action collector(s) 108 may observe multiple kinds of events, or each type of event may be associated with a different individual action collector 108. The events observed by the action collectors 108 may be specified by a configuration of the security agent 102.

The action collector(s) 108 can route observed object actions 120 to the filter/logic 110. These observed actions can include events associated with actions such as, for example the creation or execution of objects (both "creation" and "execution" being referred to herein as "execution" of object(s)) and other actions by objects, which may be referred to herein as an observed object action 120. If an observed object action 120 is qualified as an AoI as discussed below, it can be routed as a request event 122. The CSA 114 can produce and/or route a response event 126 and the exploit detection module 116 can produce and/or route an exploit detection event 130. The events 122, 126, and/or 130 and other observed events/event notifications may be routed via an event bus, which may form part of the filter/logic 110 or be a separate component (although in FIG. 1, this is only illustrated for routing request event 122 for clarity). The event bus may route events/event notifications between the components of the security agent 102.

The filter/logic 110 receives an object action 120 (e.g., via an event notification) indicating an action committed by an object executed by the computing device) monitored by action collector(s) 108. As used herein, "object" can be any function, module, process, or thread executing on a computing device on which the security agent 102 operates and/or is stored.

The filter/logic 110 can generate event notifications such as a request event 122 if the object action originates from an object of interest (OoI) or is an action of interest (AoI) as specified by the policy 112. The activities of interest may include those that enable the exploit to gain persistence, migrate to other processes, steal credentials, etc. Example OoIs may include Internet browser plug-in threads (e.g., Flash threads), embedded macros, email application threads. For example, policy 112 can specify that an action is an AoI if the action includes one or more of:

- Creating a process, for example, creating of a command line interface (CLI);
- Creating a thread;
- Creating a remote thread (i.e., creating a thread in another process), for example, dynamic-link library (DLL) injection or other thread injection, which is an action that can be used to escape one process and pivot to another process;
- Creating a new script (e.g., batch script, visual basic script, powershell script);
- Creating a new executable (e.g., creating a portable executable (PE));
- Accessing another process and reading from its memory or writing to its memory;
- Creating a service (e.g., a service can be used to start a process and/or to start a process every time system is rebooted);
- Modifying a service binary (e.g., changing portable executable files on disk instead of writing them);
- Writing a dump file;
- Decreasing security of a registration key or industry key;
- A suspicious raw disk read; or
- Privilege escalation in some contexts (e.g., user account control requests for elevation).

As used herein, the "creations" discussed above may be described as "dropping code" on a computing device. The actions discussed above may only be AoIs when certain objects commit them. For example, when an Internet browser plug-in thread is compromised, activities such as CLI creation, process migration, installation, or PE creation and execution may be indicative of compromise of the Internet browser plug-in thread by a security exploit. Moreover, an identity of an object that originated an action itself may determine whether or not an action taken by the computing device is an AoI. For example, some plugins and processes are more susceptible to vulnerabilities and are therefore used for security exploits more often. Actions taken by, or regarding, those plugins or processes may therefore be an AoI. Such object are described herein as "objects of interest" (OoIs).

The request event 122 generated by filter/logic 110 can be provided to CSA 114 in order to detect whether the AoI is an exploit by inferring that the AoI is a security exploit from a computing context at least partially derived by the CSA 114. Although FIG. 1 illustrates the CSA 114 as being a portion of the configuration of the security agent 102, it is contemplated that the CSA 114 can be configured separately. In some examples, the request event 122 can include an indication of a current context. For example, the request event 122 can specify an identifier of a first object associated with the AoI (e.g., a thread such as an Internet plugin) that is active and/or second object(s) related to the AoI by virtue of their relation to the first object (e.g., a browser associated with the Internet browser plug-in thread). In some examples, the request event 122 can include fields specifying one or more of an identifier and/or type of the object committing the AoI, target data (data that is requested to be analyzed and/or obtained by the CSA 114), etc.

In various examples, the CSA 114 can generate a characterization 124 of a call stack and/or a heap of the computing device. As used herein, a characterization 124 of the call stack can also be a characterization of the heap since the call stack addresses code on the heap. However, some of the details included in the characterization 124 generated by the CSA 114 may specifically deal with data regarding the heap in part or exclusively (e.g., permissions of memory locations in the stack, identifiers of functions that are associated with locations in the heap, etc.). Therefore, as used herein, the terms "characterization," "call stack characterization," "stack characterization," and "characterization of the stack" can include characterizations of both the heap (e.g., data pertaining partly or exclusively to the heap) and the call stack.

The CSA 114 can be configured to analyze a call stack of a computing device in order to assist inferentially analyzing whether an AoI is a security exploit. In some examples, the call stack can be located in a memory only accessible by a kernel mode of the computing device, memory accessible by a user mode of the computing device, and/or some combination thereof. A call stack can include a list of identifiers of subroutines (e.g., functions), pointers to the location (e.g., an address or an address range of memory such as a heap, for example) of code corresponding to the functions in the list, and return addresses.

When a routine calls a subroutine, the routine pushes a return address onto the call stack that will tell the computing device where to return to continue executing the routine when the subroutine has finished executing. The subroutine may itself call a second subroutine and push an entry onto the call stack (e.g., the entries are frames) including a return address within the subroutine so that execution of the subroutine will continue once the second subroutine will execute, and so on. Processing objects includes repeating this process many times, thereby creating a "chain" on the call stack. As used herein, an "active" routine or subroutine is a routine that is currently executing and has not finished processing the code associated with the routine.

Call stacks typically include a list of functions In some examples, the CSA 114 can add this data to the characterization 124. In some examples, the module of the object with which the allocated or mapped memory is associated can include or be associated with an identifier of the module and/or the object (e.g., "flash________"). In some examples, the CSA 114 can include this information in the characterization 124.

For example, as the CSA 114 is walking the stack, it may come on a frame that associates a function, a pointer to a location in memory at which a code associated with the function is located, and a return address to a location in memory. In some examples, the CSA 114 can determine whether the memory to which the pointer and/or the return address refers is associated with a loaded module (i.e., whether it is allocated memory, as defined herein).

In some examples, if the CSA 114 walks the call stack and all the pointers and/or return addresses are within ranges of addresses of memory allocated to modules of objects, the CSA 114 can return an indication of this in the characterization.

In some examples, the exploit detection module 116 can use indication(s) in the characterization 124 that the pointers and/or return addresses are within ranges of addresses of memory allocated to loaded object modules to determine that the AoI is not associated with a security exploit. In some examples, the exploit detection module 116 can decrease a confidence score that the AoI is associated with a security exploit based on indication(s) in the characterization that the pointers and/or return addresses are within ranges of addresses of memory allocated to modules of objects.

In some examples, if the CSA 114 finds that a pointer and/or a return address is located in memory outside the ranges of addresses allocated to any loaded object modules, the CSA 114 can obtain memory allocation information such as, for example, the memory permissions of the memory location (e.g., the exact address or a memory allocation range associated with the address) referred to by the pointer or return address, a size of an allocation of memory to the subroutine that is associated with the pointer or return address in the call stack. The CSA 114 can include memory allocation information in the characterization.

In some examples, the exploit detection module 116 can increase a confidence that the AoI is a security exploit when indication(s) in the characterization include an indication that an allocation size of a subroutine is one page and/or the allocation has read, write, execute, read and write, write and execute, or read and execute permissions. In some examples, the exploit detection module 116 can determine that the AoI is associated with a security exploit based at least in part on an indication that a subroutine is associated with a memory allocation having a size of one page and/or having read, write, execute, read and write, write and execute, or read and execute permissions. In some examples, the exploit detection module 116 can determine that the code corresponding to the subroutine and/or the memory allocation is shellcode.

The CSA 114 can additionally or alternatively obtain stack information such as, for example, whether a stack pointer points to an address different from an original address that an operating system of the computing device assigned (i.e., stack pivoting, pivoting the stack pointer). Commonly, the operating system uses the stack pointer to set up a heap location on the memory and/or to allocate memory to an object. In some examples, the exploit detection module 116 can determine that code corresponding to a location to which the stack pointer has been pivoted is likely shellcode (e.g., based on the response event 126 and/or the characterization 124).

In some examples, the CSA 114 can additionally or alternatively obtain stack information that includes a thread creation request and/or a process creation request information. For example, the CSA 114 can analyze a new start address generated by the operating system or kernel for a thread creation request to see whether the new start address is located within a memory range allocated to a loaded object module and, if it is not, whether allocation associated with the new start address is one page and/or what permissions are granted to the allocation.

In some examples, the CSA 114 can also be configured to obtain and include in the characterization one or more of: a name (or other identifier) of a subroutine, whether subroutine code is allocated to memory dynamically (e.g., when an address associated with the subroutine is outside a loaded object module), whether a subroutine is otherwise associated with an object, an identifier of an object with which a subroutine is associated, etc. In some examples, at least one of these and/or parts of the other data discussed above can be included in a characterization and used to increase or decrease a confidence score that the AoI is a security exploit, to identify code as being shellcode, to take preventative actions, etc.

In particular, any identifier of an object that is associated with an object that is frequently exploited (i.e., an OoI) can be used to effect the exploit detection determination. For example, the object associated with the OoI may have a name that includes "flash________", where the underscore may be version, date information, extensions, etc. In one example, the object associated with the OoI could be a function. In that example, the function name can be identified from DLL module metadata associated with the function such as, export and/or import tables. In some examples, the object associated with the OoI could be a module having a module name associated therewith. The techniques discussed herein can treat this as part of the computing context of the AoI and, since Flash is frequently exploited, it can treat the context as a vulnerable context (e.g., by increasing a confidence score that the AoI is a security exploit). In some examples, the action collector(s) can be configured to collect and provide some of this data (e.g., an object identifier or type).

In some examples, the CSA 114 can also be configured to determine whether dynamically allocated memory on the heap was allocated for a potentially valid purpose by an object such as, for example, dynamically allocating memory on the heap for just-in-time (JIT) compilation. In some examples, determining that memory was dynamically allocated (and may therefore be associated with addresses in the call stack that lie outside memory allocated to loaded object modules) pursuant to one of these purposes (e.g., JIT compilation) can be reflected in the characterization and accounted for by the exploit detection module 116 such as by decreasing a confidence score.

In some examples, in order to accomplish the functionality discussed above the CSA 114 can query a kernel of the computing device for a list of addresses (i.e., pointers and/or return addresses) from the call stack and can further query the kernel for the additional information discussed above (memory allocation information, stack information, etc.). In some examples, the CSA 114 operates in kernel mode and can therefore directly access hardware of the computing device.

In some examples, the CSA 114 is configured with a stack-walking API. The stack-walking API can be configured to "fuzzy" walk the stack. In other words, when the CSA 114 encounters a frame (i.e., a "broken frame") in the call stack where the subroutine associated with the broken frame has a return address that does not return the CSA 114 to an address that is located within a routine that called the subroutine (or within another loaded module), the CSA 114 is able to continue walking the stack from a frame proximate to the broken stack. In other implementations the CSA 114 can resume walking the call stack (i.e., "recover") from a frame that is further from the broken frame. For example, the CSA 114 can choose a frame from which to walk based on one or more of fuzzy selection logic or interest in a particular routine. For example, since a broken frame was discovered that is associated with a particular subroutine, the CSA 114 could decide to skip examining the rest of the frames attributable to a root routine that includes the subroutine since that routine is compromised. In some examples, the fuzzy stack walking API can operate in a kernel mode of the computing device.

In some examples, after the CSA 114 recovers from discovering the broken frame, the CSA 114 can walk back on the stack until the CSA 114 obtains further data that can affect a confidence score and/or that can be included in the characterization. For example, the CSA 114 can continue to walk the call stack until the CSA 114 unwinds the stack to a routine that is associated with an identifier of an object that is frequently exploited. In some examples, the CSA 114 can continue to walk back on the call stack until enough information is acquired to form the characterization or until the CSA 114 either acquires target data corresponding to information about rules of a policy or finds that it cannot acquire the target data (where target data can be data that is requested to be analyzed by the request event and/or corresponds to rules of the policy, as discussed below).

As described above, the CSA can generate a response event 126 that can include at least part of the characterization. Upon generating a response event 126, the CSA 114 can provide the response event 126 to the event bus, which may route the event in accordance with a configuration of the security agent 102. In some examples, the response event can include a set of flags. In an implementation that utilizes flags, the flag values can correspond to parameters of a rule of a policy that the exploit detection module 116 can use to determine whether or not the AoI is a security exploit. In some examples, the flag values can correspond to parameters that a configuration of exploit detection module 116 uses to determine whether or not the AoI is a security exploit.

For example, the policy can include a policy rule that an AoI should be treated as a security exploit if the CSA encounters a frame in the call stack that (1) is associated with code that has a stack address (i.e., a point or a return address) that lies outside a range of memory addresses allocated to a loaded object module, (2) is associated with heap memory having a size of one page, and (3) has write and execute permissions. Or, another example, the configuration of exploit detection module 116 can be configured to treat the AoI as a security exploit for conditions (1)-(3). In this case, flags values of the response event 126 could indicate whether or not any of conditions (1)-(3) are true, for example.

In some examples, information about a policy rule or configuration of the exploit detection module 116 can be provided as part of the request event 122. In some examples, the CSA 114 can use this information about the policy rule to determine what data the CSA 114 can seek to obtain and/or what data to include in the characterization. The CSA 114 can use this information as "target data" that the CSA 114 can seek to obtain.

In some examples, the characterization and the response event 126 includes any portion of the data obtained by the CSA 114. In some examples, the response event 126 includes one entry per broken frame and/or one entry per frame associated with heap memory that contains evidence of shellcode. As used herein, "evidence" includes any data that will cause the exploit detection module 116, pursuant to its configuration, to modify a confidence score and/or a determination of whether the AoI is a security exploit.

In some examples, the exploit detection module 116 can calculate a confidence score that the AoI is a security exploit based at least in part on the response event 126 (and, in some examples, the request event 122 as well). In that case, the exploit detection module 116 can create an exploit detection event 130 if a calculated confidence score exceeds a score threshold (e.g., the score threshold can be set by the remote security service 104 in some examples). In additional or alternate examples, the exploit detection module 116 can ascertain how well the response event 126 (and the request event 122 in some examples) matches an exploit heuristic (e.g., a heuristic defined by a policy or configuring the exploit detection module 116). An example of an exploit heuristic could be when the CSA 114 discovers a broken frame that has an address that is associated with memory on the heap that is one page in size and has write and execute permissions. Upon generating an exploit detection event 130, the exploit detection module 116 can provide the exploit detection event to the event bus, which may route the event in accordance with a configuration of the security agent 102, which may include fingerprinting actor 118. In some examples, the exploit detection module 116 can additionally or alternatively provide, over network(s) 106, the exploit detection event 130 and/or other related information to the remote security service 104.

In some examples, responsive to reception of the exploit detection event 130 the security agent and/or the remote security service 104 can take preventative actions. For example, the security agent 102 can label code associated with a broken frame as shellcode, destroying an object or a portion of an object associated with the shell code, stopping or preventing execution of the AoI and/or an object related to the AoI, stopping or preventing an input/output operation, stopping or preventing a network operation, patching the vulnerability, or causing the computing device to reboot. The security agent can be configured to take preventative action automatically (i.e., without receiving and/or requesting user input). For example, the security agent 102 can take preventative action when the confidence score that an AoI is a security exploit exceeds a threshold value. In some examples, the security agent 102 can also be configured to notify a user that preventative action was taken.

In response to receiving an exploit detection event 130, the remote security service 104 can update the policy utilized by the filter or logic or update the configuration of the security agent 102 and/or CSA 114. The remote security service 104 can also provide instructions or other updates to the security service 104 to diagnose, prevent, or heal based on the exploit.

Responsive to receiving the exploit detection event 130, the fingerprinting actor 118 can be configured to "fingerprint" identified exploits and/or the computing context 132 in which they occurred (where the computing context refers to any of the data discussed herein). Fingerprinting can include storing at the computing device or providing to the remote security service 104 information regarding the exploit and/or the computing context as a structured item such as a database (i.e., "fingerprint" herein) with sufficient information to distinguish between and identify one or more of the type of vulnerability that was exploited, where the vulnerability is located in an object module, and/or what exploit package was use (e.g., name, version number, variant, etc. of malware). In some examples, sufficient information can include at least a portion of the characterization, at least a portion of data obtained or observed by the security agent 102 and/or CSA 114 at some point from the time an action was collected, and/or the AoI. The information could also include information about the stack frames, which in some examples can be reported in the response event by the CSA 114.

In some examples, the fingerprinting actor 118 and/or the remote security service 104 can be configured to use a database of fingerprints to identify a vulnerability in an object module based on one or more of the AoI, the exploit detection event, fingerprint(s), or the characterization, the vulnerability corresponding to a location in the object module that was exploited. The fingerprinting actor 118 and/or the remote security service 104 can also be configured to identify an exploit package that was used to exploit the vulnerability based on one or more fingerprints. In some examples, fingerprint data can be used to identify what type of vulnerability was exploited after the exploit detection event 130 is received by the exploit detection module 116. If an existing vulnerability does not exist (e.g., a vulnerability known and therefore included in a policy or configuration of the security agent 102), the fingerprinting actor 118 can create an elevated event for the vulnerability, which it can transmit to the remote security service 104 and/or conduct further analysis on to determine if the vulnerability may be a zero-day vulnerability (e.g., an undiscovered and unpatched vulnerability).

Example Security Agent

Figure 2:
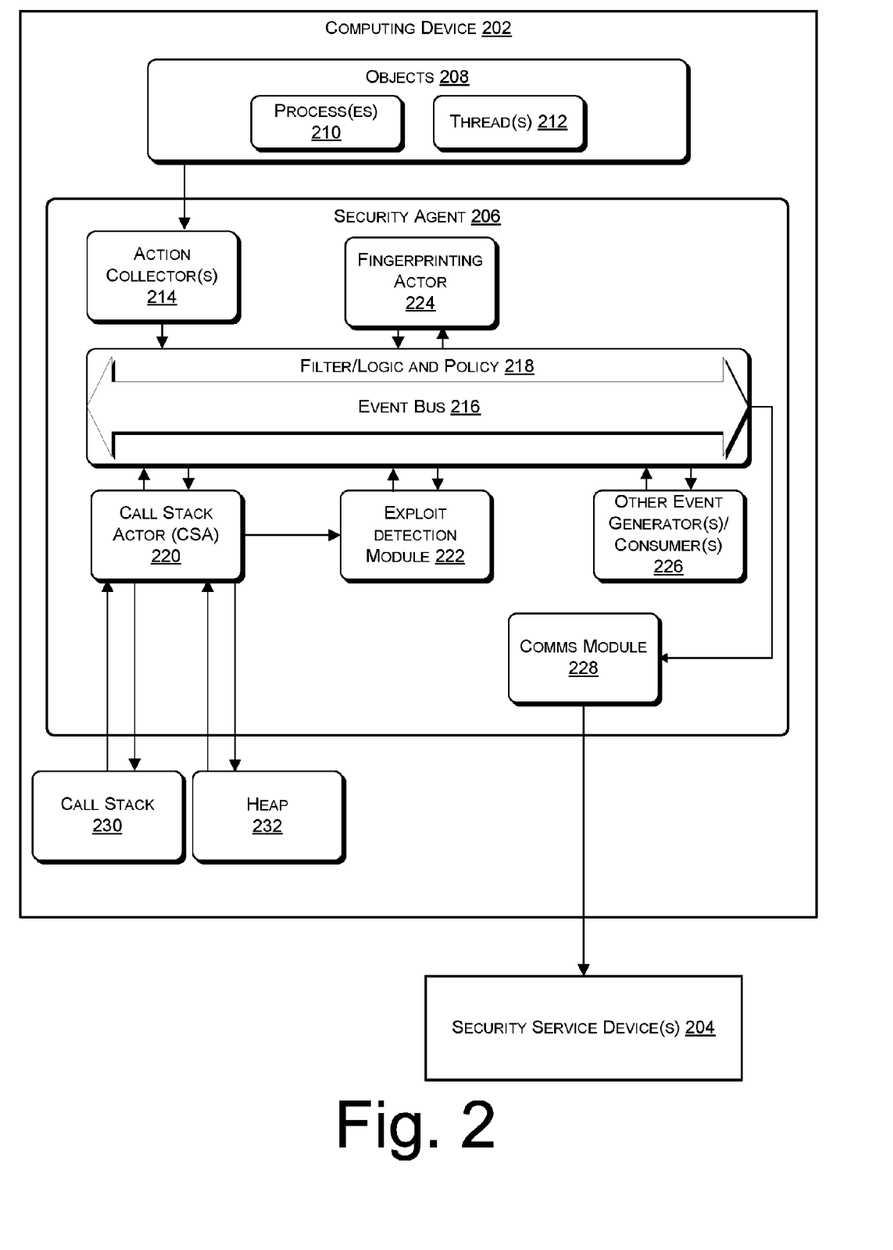
FIG. 2 illustrates an example security agent which includes a filter/logic for detecting and generating event notifications potentially relevant to security exploits, a call stack actor for obtaining a computing context from which the example security agent can inferentially detect security exploits, an exploit detection module for determining whether the data received from at least the call stack actor and/or the filter/logic is indicative of an exploit, and a fingerprinting actor for aggregating data about exploits and the computing contexts the exploits occurred in order to provide more robust exploit deterrence and identification.

FIG. 2 illustrates an example security agent which includes a filter/logic for detecting and generating event notifications potentially relevant to security exploits, a call stack actor for obtaining a computing context from which the example security agent can inferentially detect security exploits, an exploit detection module for determining whether the data received from at least the call stack actor and/or the filter/logic is indicative of an exploit, and a fingerprinting actor for aggregating data about exploits and the computing contexts they occurred in order to provide more robust exploit deterrence and identification.

As illustrated, a computing device 202 may receive security services from remote security service device(s) 204 working with a kernel-level security agent 206 installed on the computing device 202. The computing device 202 may include a plurality of objects 208, such as process(es) 210 and thread(s) 212. The kernel-level security agent 206 includes action collector(s) 214, an event bus 216, filter/logic and policy 218, call stack actor CSA 220, an exploit detection module 222, fingerprinting actor 224, other event generator(s)/consumer(s) 226, and a communication module 228. The computing device 202 may also include a call stack 230 and a heap 232, either or both of which can be accessible from user mode and/or kernel mode. In some examples, the call stack 230 and the heap 232 are only accessible via kernel mode.

In various embodiments, the computing device 202 and security service device(s) 204 and network may be same sort of devices, service, and network described above. Likewise, the security agent 206 may be an example of security agent 102, action collector(s) 214 may be an example of action collector(s) 108, event bus 216 may be an example of the event bus described above with reference to FIG. 1, filter/logic and policy 218 may be examples of filter/logic 110 and policy 112, CSA 222 may be an example of CSA 114, exploit detection module 222 may be an example of exploit detection module 116, and fingerprinting actor 224 may be an example of fingerprinting actor 118.

In some implementations, the plurality of objects 208 may include any sort of components of the computing device 202, such as process(es) 210 and thread(s) 212. The plurality of objects 208 may also include trees, modules, or any other sort of components. For example, a thread 212 may be a vulnerable thread that is targeted by a security exploit. An example of such a thread—the Internet browser plug-in/Flash thread—and its activities is described above with respect to FIG. 1.

As illustrated in FIG. 2, the event bus 216 and filter/logic and policy 218 may serve as routing, filtering, and analysis component(s) which connect the other components in the architecture of the security agent 206. The event bus 216 and filter/logic and policy 218 may receive events from other components and either route those received events, filter and route a subset of those received events, or analyze received events and generate and route further received events. The actions taken upon any received events by the event bus 216 and filter/logic and policy 218 may be driven by a configuration of the security agent 206 and the policy.

Event generator(s) and consumer(s) 226 may include modules that take actions, such as CSA 220, exploit detection module 222, fingerprinting actor 224, and other actors. Actors may receive events via the event bus 216 and take some action or actions based on the events. For example, an actor may receive an exploit detection event and take a preventative action based on the exploit detection event. Also or instead, the actor may store information associated with the event in a data structure or communicate information associated with the event to the communication module 228 for transmission to the security service device(s) 204. In further implementations, upon receiving an exploit detection event, the actor may retrieve additional information from a data structure and based on the exploit detection event and the additional information may take some action, such as a preventive action.

In various embodiments, the communications module 228 may represent network protocol stack(s), network interface driver(s), and any other network interface components utilized by the kernel-level security agent 206 to communicate with the security service device(s) 204 over one or more networks. The communications module 228 may be a kernel mode component of the computing device 202. Further, the communications module 228 may transmit events, other notifications, and data associated events from the kernel-level security agent 206 to the security service device(s) 204. The communications module 228 may also transmit configuration updates received from the security service device(s) 204 to a configuration manager of the kernel-level security agent 206 and healing instructions and/or events from the security service device(s) 204 to the event bus 216 for filtering and/or dispatch.

Example System

FIG. 3 illustrates a component level view of a computing device configured with objects targeted by exploits and a security agent. As illustrated, computing device 300 comprises a system memory 302 storing object(s) 304 targeted by exploits 306 and a security agent 308 that includes a filter/logic 310, a policy 312, correlator(s) 314, and a data structure 316. Also, computing device 300 includes processor(s) 318, a removable storage 320 and non-removable storage 322, input device(s) 324, output device(s) 326 and communication connections 328 for communicating with other computing devices 330.

In various embodiments, system memory 302 is volatile (such as RAM), non-volatile (such as ROM, flash memory, etc.) or some combination of the two. The object 304 may be any sort of object, such as a function, process, or thread that is compromised by a security exploit 306. Examples of such objects 304 and exploits 306 are examples of similarly named components described further herein. The security agent 308 and its filter/logic 310, policy 312, correlator(s) 314, and data structure 316 are also examples of similarly named components further describe herein.

In some embodiments, the processor(s) 318 is a central processing unit (CPU), a graphics processing unit (GPU), or both CPU and GPU, or other processing unit or component known in the art.

Computing device 300 also includes additional data storage devices (removable and/or non-removable) such as, for example, magnetic disks, optical disks, or tape. Such additional storage is illustrated in FIG. 3 by removable storage 320 and non-removable storage 322. Non-transitory computer-readable media may include volatile and nonvolatile, removable and non-removable media implemented in any method or technology for storage of information, such as computer readable instructions, data structures, program modules, or other data. System memory 302, removable storage 320 and non-removable storage 322 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 300. Any such non-transitory computer-readable media may be part of the computing device 300.

Computing device 300 also has input device(s) 324, such as a keyboard, a mouse, a touch-sensitive display, voice input device, etc., and output device(s) 326 such as a display, speakers, a printer, etc. These devices are well known in the art and need not be discussed at length here.

Computing device 300 also contains communication connections 328 that allow the computing device 300 to communicate with other computing devices 330, such as the security service device(s) 204.

Example Process

Figure 4:
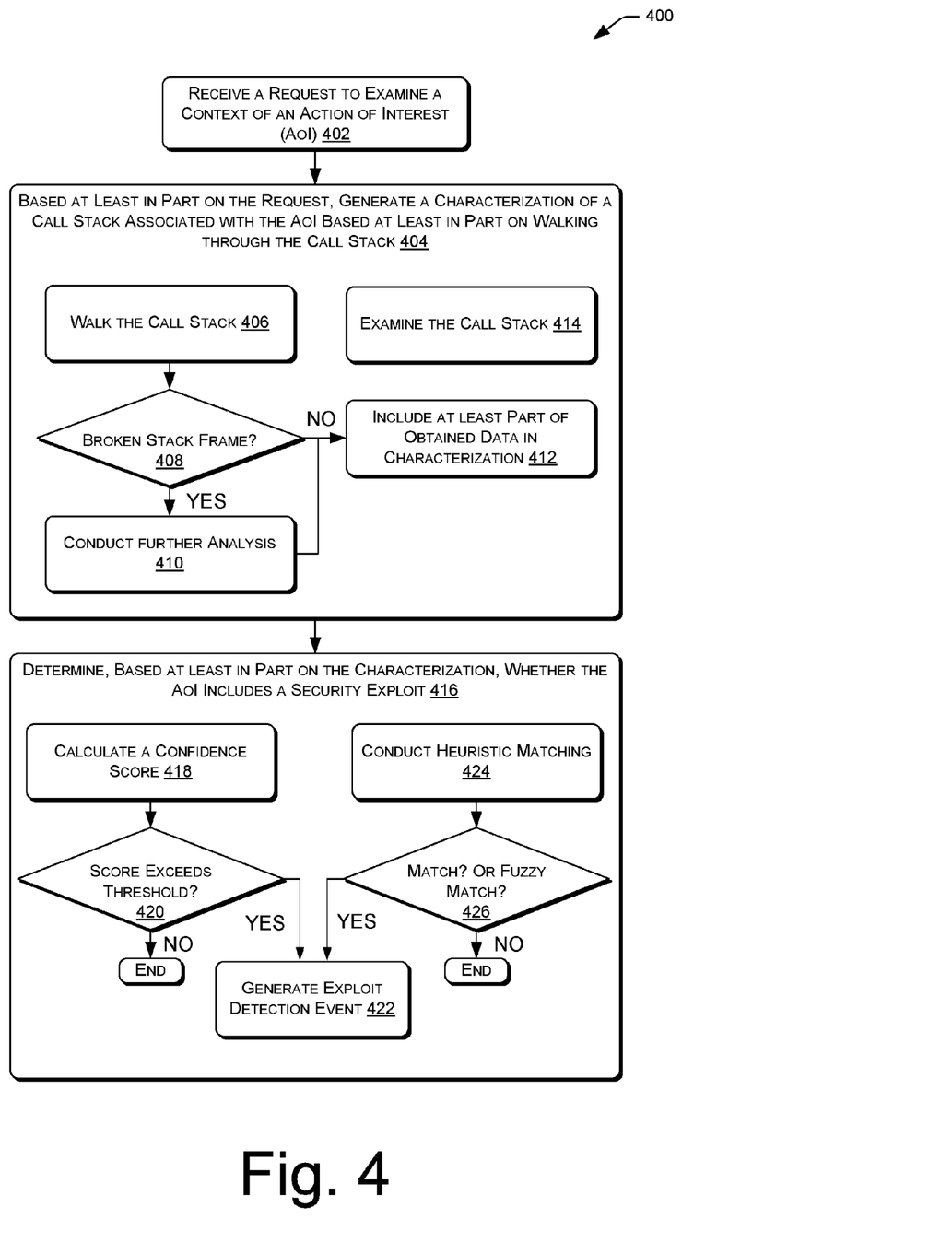
FIG. 4 illustrates an example process for receiving a request to examine a context of an action of interest (AoI), generating a characterization of a call stack associated with the AoI based at least in part on walking through the call stack, and determining based on the characterization whether the AoI includes a security exploit.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for receiving a request to examine a context of an action of interest (AoI), generating a characterization of a call stack associated with the AoI based at least in part on walking through the call stack, and determining based on the characterization whether the AoI includes a security exploit.

The process includes, at 402, receiving, by a call stack actor (CSA), a request to examine a context of an AoI. In some examples, the AoI could have been generated by an object such as a process or a thread (e.g., an Internet browser plug-in thread or an email application thread). Further, the receiving may be based on a configurable policy of a security agent that is configured with the CSA.

At 404, the CSA can, based at least in part on the request, generate a characterization of a call stack associated with the AoI, the generating based at least in part on walking through the call stack at 406.

At 408 (which can be part of the characterization generation 404), if the CSA encounters a frame in the call stack where the subroutine associated with the frame has a return address that does not return the CSA to an address that is located within a routine that called the subroutine, the frame is broken and the CSA, at 410, may conduct further analysis of the subroutine related to the frame (e.g., the CSA can obtain memory allocation information associated with the subroutine on the heap, etc.).

At 412 (which can also be part of the characterization generation 404), if the CSA does not encounter a broken stack frame, the CSA can include at least part of the obtained data in the characterization. If the CSA encounters a broken stack frame, the characterization can include an indication of this and at least a portion of the data uncovered during further analysis at 410.

At 414, the CSA can additionally or alternatively examine the call stack (which can also be part of the characterization generation 404). For example, the CSA can determine whether a stack pointer has been moved (e.g., pivoted) from an original location, etc.

At 416, a security agent can determine, based at least in part on the characterization, whether the AoI includes a security exploit. In some examples, this can include, at 418, calculating a confidence score (e.g., based on the characterization and/or other data available such as, for example, an identifier of an OoI, a fingerprint, a heuristic fuzzy match score, or a knowledge repository). If the confidence score exceeds a threshold at 420, the process 400 can further include generating an exploit detection event at 422; if the threshold is not exceeded, the process can end. In some examples, the security agent can additionally or alternatively, attempt to match the characteristic to an exploit heuristic at 424. If the characteristic matches the heuristic at 426 or fuzzy matches the heuristic, in some examples, the security agent can generate an exploit detection event at 422.

Example Clauses

A. A method comprising: receiving, by a call stack actor (CSA), a request to examine a context of an action of interest (AoI); generating, by the CSA and based at least in part on the request, a characterization of a call stack associated with the AoI, the generating based at least in part on walking through the call stack; and determining, by a security agent and based at least in part on the characterization, that the AoI includes a security exploit.

B. A method as paragraph A recites, the determining that the AoI includes the security exploit further comprises determining that the characterization meets at least a portion of a heuristic defining characteristics of security exploits.

C. A method as either paragraph A or B recites, the call stack including multiple frames and the characterization of a frame of the call stack including one or more of: a module identifier of a module associated with an address of the frame, a return address, an indicator of whether a return address is associated with memory previously allocated for an object, the object including one of a function, a module, a process, or a thread, a memory region associated with the frame, an object identifier of a process or a thread associated with a memory region, permissions of a memory region, or a size of a memory region.

D. A method as any one of paragraphs A-C recites, the determining that the AoI includes the security exploit is based at least in part on one or more of: determining that the return address is outside memory previously allocated for an object; determining that the object identifier is associated with a vulnerable object; determining that permissions of the memory region include two or more of read, write, and execute; or determining that the memory region is one page in length.

E. A method as any one of paragraphs A-D recites, the determining including determining that the return address is outside memory previously allocated for an object and the method further including treating code that the return address points to as malicious code.

F. A method as any one of paragraphs A-E recites, further comprising committing a preventative action without receiving input from a user and based at least in part on the determining that the AoI includes the security exploit.

G. A method as any one of paragraphs A-F recites, the preventative action including one or more of: stopping or preventing execution of the AoI, stopping or preventing execution of an object associated with the AoI, stopping or preventing an input/output operation, stopping or prevention network operations, or causing a computing device that committed the AoI to reboot.

H. A method as any one of paragraphs A-G recites, the determining including: calculating a confidence score based at least in part on the characterization; and determining that AoI includes a security exploit based at least in part on the confidence score exceeding a threshold confidence score.

I. A computing device including: a processor; a call stack actor (CSA) configured to be executed by the processor on the computing device, the CSA including: logic configured to receive a request to perform analysis of an action of interest (AoI) and provide a characterization to a security agent; and a call stack walker configured to: identify addresses of memory devoted to a call stack associated with the AoI, and generate the characterization from the call stack associated with the AoI based at least in part on walking the call stack starting at an entry associated with the AoI; and the security agent configured to be executed by the processor on the computing device, the security agent including logic configured to receive the characterization and determine that the AoI is a security exploit of the computing device based at least in part on the characterization.

J. A computing device as paragraph I recites, the security agent further including logic to prevent the security exploit from being completed without receiving user input.

K. A computing device as either paragraph I or J recites, the CSA operating in a kernel mode of the computing device and the call stack being accessible by a kernel of the computing device.

L. A computing device as any one of paragraphs I-K recites, the call stack walker of the CSA configured to fuzzy walk the call stack, fuzzy walking including: encountering a frame in the call stack that breaks a trace of the call stack; recording information about the frame, the information including one or more of a return address associated with the frame, a memory associated with the frame, a process or a thread associated with the frame or the memory region, or a function associated with the frame; and continuing to walk the call stack from a frame proximate to the frame in the call stack that breaks the trace.

M. A computing device as any one of paragraphs I-L recites, the CSA configured to fuzzy walk the call stack in order to obtain an object identifier of a function, module, process, or thread that initiated a chain of functions reflected in the call stack that resulted in the AoI and the CSA further configured to include the object identifier in the characterization.

N. A computing device as any one of paragraphs I-M recites, the call stack being accessible by a kernel of the computing device and the CSA configured to fuzzy walk the call stack in kernel mode.

O. A computing device as any one of paragraphs I-N recites, the generating the characterization of the call stack including: obtaining a list of addresses of the memory associated with the call stack and the AoI, the list of addresses being associated with frames of the call stack; querying a kernel of the computing device for details related to at least one frame of the frames, the details including one or more of: a function associated with the frame, a stack pointer associated with the frame, a return address associated with the frame, a location in the memory associated with the return address or the stack pointer, memory allocation information regarding the location, the memory allocation information including an indication of whether the location is within a memory range that has been allocated to an object, the object including a function, module, process, or thread, an object identifier associated with the object to which the memory range is allocated if the location is within a memory range that has been allocated to an object, permissions of the location or memory associated with the object, a size of the location, or a size of code associated with the object.

P. A computing device as any one of paragraphs I-O recites, wherein the CSA chooses what details to include in the characterization based at least in part on one or more of the request to perform analysis or a type of the AoI from among identified types of AoIs.

Q. A computing device as any one of paragraphs I-P recites, the security agent further including logic to: responsive to determining that the AoI is the security exploit of the computing device, treat as malicious code a portion of code stored on the memory and referred to in the characterization; store in the memory or transmit to a remote memory a copy of the malicious code; associate one or more of a vulnerability identifier, offset identifier, or an exploit name with the copy of the malicious code; store in the memory or transmit to the remote memory the characterization; and gather and store in the memory or transmit to the remote memory additional information, the additional information including one or more of a name, version, or address ranges of the malicious code loaded in the memory.

R. A computing device as any one of paragraphs I-Q recites, the logic being further configured to use one or more of copies of malicious code, vulnerability identifiers, offset identifiers, exploit names, characterizations, or additional information to improve accuracy of determining whether the AoI is the security exploit.

S. A system including: a processor; a memory having stored thereon computer-executable instructions that, when executed by the one or more processors, configure the system to perform operations including: detecting an action of interest (AoI) from among actions taken by the system; identifying a record stored in the memory and recording previous actions taken by the system that resulted in the AoI; examining a record for evidence that the AoI is an exploit of the system, the record being stored on the memory; and taking preventative measures regarding the AoI when the record contains evidence that the AoI is an exploit.

T. A system as paragraph S recites, the record being a call stack and the operations further including: walking the call stack, starting at a frame corresponding to the AoI in the call stack, until: the walking reaches a stack frame that is associated with a return address that is not associated with a module loaded on the memory, or the walking reaches an end of the call stack or a root thread or root process; and responsive to the walking reaching the stack frame that is associated with the return address that is not associated with a module loaded on the memory, continuing walking from a subsequent entry in the call stack until the walking reaches an end of the call stack or root thread or root process, the subsequent entry being further from both an entry corresponding to the previous function and an entry corresponding to a function that committed the AoI.

U. A system implementing the method of any one of paragraphs A-H.

V. Computer-readable media having stored thereon computer-executable instructions to accomplish the operations of any one of paragraphs A-H.

W. Means for accomplishing the operations of any one of paragraphs A-H.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving, by a call stack actor (CSA) executing on one or more processors, a request to examine a context of an action of interest (AoI);
   determining an object associated with the AoI and one or more addresses associated with the object;
   generating, by the CSA and based at least in part on the request, a characterization of a call stack associated with the AoI, the generating based at least in part on walking through the call stack and determining that a return address in a frame of the call stack is associated with memory outside the one or more addresses; and
   determining, by a security agent executing on the one or more processors and based at least in part on the characterization, that the AoI includes a security exploit.

2. A method as claim 1 recites, the determining that the AoI includes the security exploit further comprises determining that the characterization meets at least a portion of a heuristic defining characteristics of security exploits.

3. A method as claim 1 recites, the call stack including multiple frames and the characterization of a frame of the call stack including at least one of:
   a module identifier of a module associated with an address of the frame;
   a return address;
   the indicator of whether the return address is associated with memory previously allocated for the object, the object including one of a function, a module, a process, or a thread;
   a memory region associated with the frame;
   an object identifier of a process or a thread associated with a memory region;
   permissions of the memory region; or
   a size of the memory region.

4. A method as claim 3 recites, the determining that the AoI includes the security exploit is based at least in part on at least one of:
   determining that the return address is outside memory previously allocated for an object;
   determining that the object identifier is associated with a vulnerable object;
   determining that permissions of the memory region include two or more of read, write, and execute; or
   determining that the memory region is one page in length.

5. A method as claim 1 recites, the determining including determining that the return address is outside memory previously allocated for the object and the method further including treating code that the return address points to as malicious code.

6. A method as claim 1 recites, further comprising committing a preventative action without receiving input from a user and based at least in part on the determining that the AoI includes the security exploit.

7. A method as claim 6 recites, the preventative action including at least one of:
   stopping or preventing execution of the AoI,
   stopping or preventing execution of an object associated with the AoI,
   stopping or preventing an input/output operation,
   stopping or prevention network operations, or
   causing a computing device that committed the AoI to reboot.

8. A method as claim 1 recites, the determining including:
   calculating a confidence score based at least in part on the characterization; and
   determining that AoI includes a security exploit based at least in part on the confidence score exceeding a threshold confidence score.

9. A computing device including:
   one or more processors;
   one or more computer-readable media storing instructions executable by the one or more processors, wherein the instructions, when executed, cause the computing system to perform operations comprising:
      receiving a request to perform analysis of an action of interest (AoI);
      identifying one or more addresses of memory allocated to one or more objects;
      walking a call stack, starting at a frame in the call stack corresponding to the AoI, until:
         the walking reaches a stack frame that is associated with a return address that is not associated with a module loaded on the one or more computer-readable media and continuing to walk the call stack until the walking reaches at least one of an end of the call stack, a root thread, or a root process, or the walking reaches at least one of an end of the call stack, a root thread, or a root thread process; and comparing the return address with one or more addresses associated with the root thread or the root process;

and determining that the AoI is a security exploit of the computing device based at least in part on determining that the return address is outside the one or more addresses.

10. A computing device as claim 9 recites, wherein the operations further comprise preventing at least one of the AoI or the security exploit from being completed without receiving user input.

11. A computing device as claim 9 recites, wherein the operations are conducted in a kernel mode of the computing device, the call stack being accessible by a kernel of the computing device.

12. A computing device as claim 9 recites, wherein generating the characterization comprises fuzzy walking the call stack to obtain an object identifier of a function, module, process, or thread that initiated a chain of functions reflected in the call stack that resulted in the AoI and including the object identifier in the characterization.

13. A computing device as claim 9 recites, wherein the call stack is accessible by a kernel of the computing device and fuzzy walking is conducted in kernel mode.

14. A computing device as claim 9 recites, the generating the characterization of the call stack including:

obtaining a list of addresses of the memory associated with the call stack and the AoI, the list of addresses being associated with frames of the call stack;

querying a kernel of the computing device for details related to at least one frame of the frames, the details including at least one of:
a function associated with the frame,
a stack pointer associated with the frame,
a return address associated with the frame,
a location in the memory associated with the return address or the stack pointer,
memory allocation information regarding the location, the memory allocation information including an indication of whether the location is within a memory range that has been allocated to an object, the object including a function, module, process, or thread,
an object identifier associated with the object to which the memory range is allocated if the location is within a memory range that has been allocated to an object,
permissions of the location or memory associated with the object,
a size of the location, or
a size of code associated with the object.

15. A computing device as claim 14 recites, wherein the operations further comprise selecting at least one of the details to include in the characterization based at least in part on at least one of the request to perform analysis or a type of the AoI from among identified types of AoIs.

16. A computing device as claim 9 recites, wherein the operations further comprise:

responsive to determining that the AoI is the security exploit of the computing device, treating as malicious code a portion of code stored on the memory and referred to in the characterization;

storing in the memory or transmitting to a remote memory a copy of the malicious code;

associating at least one of a vulnerability identifier, offset identifier, or an exploit name with the copy of the malicious code;

storing in the memory or transmit to the remote memory the characterization; and gather and store in the memory or transmit to the remote memory additional information, the additional information including at least one of a name, version, or address ranges of the malicious code loaded in the memory.

17. A computing device as claim 16 recites, the logic being further configured to use at least one of copies of malicious code, vulnerability identifiers, offset identifiers, exploit names, characterizations, or additional information to improve accuracy of determining whether the AoI is the security exploit.

18. A system including:

a processor;

a memory having stored thereon computer-executable instructions that, when executed by the one or more processors, cause the system to perform operations including:

detecting an action of interest (AoI) from among actions taken by the system;

determining a frame of a call stack associated with the AoI;

walking the call stack, starting at the frame in the call stack corresponding to the AoI, until:

the walking reaches a stack frame that is associated with a return address that is not associated with a module loaded on the one or more computer-readable media and continuing to walk the call stack until the walking reaches at least one of an end of the call stack, a root thread, or a root process, or the walking reaches at least one of an end of the call stack, a root thread, or a root thread process; and and determining, based at least in part on the walking, a confidence score that indicates that the AoI is an exploit.

* * * * *